(12) United States Patent
Andreoli-Fang et al.

(10) Patent No.: US 12,267,184 B1
(45) Date of Patent: Apr. 1, 2025

(54) ENABLING INTER-NODE COMMUNICATION USING LOCAL COMMUNICATION NETWORKS

(71) Applicant: Cable Television Laboratories, Inc., Louisville, CO (US)

(72) Inventors: Jennifer Andreoli-Fang, Louisville, CO (US); Bernardo Huberman, Louisville, CO (US); Mario Di Dio, Louisville, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 32 days.

(21) Appl. No.: 17/354,711

(22) Filed: Jun. 22, 2021

Related U.S. Application Data

(60) Provisional application No. 63/184,873, filed on May 6, 2021, provisional application No. 63/042,094, filed on Jun. 22, 2020.

(51) Int. Cl.
*H04L 12/46* (2006.01)
*H04L 12/28* (2006.01)

(52) U.S. Cl.
CPC .......... *H04L 12/46* (2013.01); *H04L 12/2801* (2013.01)

(58) Field of Classification Search
CPC ............................... H04L 69/28; H04L 12/46
See application file for complete search history.

(56) References Cited

U.S. PATENT DOCUMENTS

| 2016/0021661 | A1* | 1/2016 | Yerramalli | H04W 16/14 370/329 |
|---|---|---|---|---|
| 2017/0156142 | A1* | 6/2017 | Sato | H04W 72/0446 |
| 2018/0046242 | A1* | 2/2018 | Warneke | G06F 1/3293 |
| 2018/0145746 | A1* | 5/2018 | Finkelstein | H04L 69/08 |

OTHER PUBLICATIONS

"Firing Squad Synchronization Problem", Wikipedia, Apr. 13, 2020 (Year: 2020).*

* cited by examiner

*Primary Examiner* — Nicholas P Celani
(74) *Attorney, Agent, or Firm* — Snider IP (57) ABSTRACT

Systems and methods disclosed herein provide an inter-node interface for communication between client nodes, such as modems, in a local communication network (LCN), where local data does not pass through a network hub or mobile core. To improve signal strength, SINR and handoff speeds in the LCN, the disclosed systems and methods also enable a client node within the LCN to self-direct simultaneous transmission of a common data packet by a plurality of client nodes, without employing components of the Xhaul transport system for coordination.

14 Claims, 3 Drawing Sheets

ENABLING INTER-NODE COMMUNICATION USING LOCAL COMMUNICATION NETWORKS

CROSS-REFERENCE TO RELATED APPLICATIONS

This application claims the benefit of and priority to U.S. Provisional Patent Application Nos. 63/042,094, filed Jun. 22, 2020, and 63/184,873, filed May 6, 2021, each of which is hereby incorporated by reference in its entirety.

STATEMENT REGARDING FEDERALLY SPONSORED RESEARCH

None.

BACKGROUND

To accommodate an ever-increasing demand for network resources, methods for transferring information between network participants without passing traffic through the cable modem termination system (CMTS) are being implemented. For example, wireless base stations in an LTE system may communicate directly with each other according to an X2 (4G) or Xn (5G) interface, which is a logical inter-node interface enabling interference management and fast handover between eNodeBs (eNBs). Such peer-to-peer communication between nodes reduces latency for directly transmitted signals and alleviates traffic in the mid-haul and backhaul portions of the network, thereby increasing overall system capacity.

However, extension of the X2 interface to the edge of the telecommunication network has not yet been achieved for inter-node communication between modems on a Data Over Cable Service Interface Specification (DOCSIS) transport. Instead, the DOCSIS logical interface typically goes from cable modem (CM) to CMTS to mobile core, back to CMTS to a different CM. Such transmissions have high latency, are load-dependent, and contribute to network traffic in the mid-haul and backhaul portions of the network.

SUMMARY

U.S. Patent Publication No. 2019/0356603, which is hereby incorporated by reference in its entirety, discloses systems and methods for transmitting data in a communication network including a shared communication medium where local data is transmitted between client nodes according to a first data protocol and remote data is transmitted between a client node and a network hub according to a second data protocol. To implement the different protocols, client nodes are configured with first and second communication modules that support communication with other client nodes and the network hub, respectively. The present disclosure extends the concepts of the '603 publication to systems and methods where local data and remote data may be transmitted according to the same data protocol, e.g., DOCSIS, and to systems and methods enabling self-directed simultaneous transmission from two or more client nodes within a local communication network (LCN).

In an LCN, local data may be transmitted or received through bandwidth allocated for local transmissions. For example, packets with a destination (DST) address within the LCN will get routed to other CMs within the LCN by a first communication module of the initiating modem; otherwise the packets will be sent by a second communication module of the initiating modem to the CMTS as usual. For local transmissions, a small portion of the existing DOCSIS spectrum may be vacated or a portion of the upstream and/or downstream guard band may be used. Further, modems can run an economically scalable protocol such as point-to-multipoint (P2MP) Ethernet or Wi-Fi in this spectrum.

In an embodiment, local transmissions may be improved by simultaneously transmitting a common data packet through a plurality of client nodes to the target UE to increase signal strength, SINR, and throughput. To obtain the greatest benefits in terms of speed and network capacity, all aspects of the local data transmission, including coordination of simultaneous transmission within an LCN, should be implemented locally, i.e., without employing components of the Xhaul transport system. Methods disclosed herein provide for self-directed transmission/reception scheduling by the LCN client nodes. One disclosed method of achieving simultaneous transmission from multiple client nodes without coordination from the Xhaul transport involves use of a "firing squad" algorithm disclosed herein.

In an aspect, a method of enabling inter-node communication between a plurality of modems within a local communication network comprises: receiving, at a first modem of a plurality of modems within a local communication network (LCN), a data packet from a first UE of the LCN for transmission to a second UE of the LCN; identifying the data packet as local data; transmitting the data packet and transmission timing instructions from the first modem to a second modem of the plurality of modems using a bandwidth allocated for local data transmissions; and simultaneously transmitting the data packet from the first modem and the second modem to the second UE.

In an embodiment, the data packet is transmitted according to a Data Over Cable Service Interface Specification (DOCSIS) protocol.

In an embodiment, the first modem and the second modem are connected to a shared transmission medium, such as a shared transmission medium selected from the group consisting of a coaxial electrical cable, a hybrid fiber coaxial cable, an optical cable, a wireless transmission medium and combinations thereof. Wireless transmission media include, but are not limited to, infrared, broadcast radio, cellular radio, and microwaves (e.g., for satellite communication).

In an embodiment, communication between the first modem and the second modem occurs through an intermediary modem, and transmission timing instructions comprise instructions for the intermediary modem to relay to the second modem updated transmission timing instructions adjusted by an amount of time the data packet travels between the first modem and the intermediary modem. In an embodiment, the transmission timing instructions are relayed from modem to modem without being adjusted by an amount of time the data packet travels between modems, and each receiving modem compares the original transmission timing instructions to a known transmission time from the originating modem to the receiving modem. In an embodiment, transmission timing instructions are updated to account for transmission time prior to being forwarded to a subsequent CN. In an embodiment, transmission timing instructions comprise a firing squad algorithm.

In an embodiment, a modem is a cable modem, a digital subscriber line (DSL) modem, a wireless modem, or a satellite modem. In an embodiment, the first modem, second modem, and/or intermediary modem is a set of multiple modems.

In an embodiment, simultaneous transmission is self-directed by a first modem.

In an embodiment, transmission timing instructions and data packets may be transmitted via unicast and/or multicast transmissions on the inter-node interface within the LCN. For example, a centralized approach may allow a first client node to transmit to a plurality of nearby client nodes, which then each transmit via unicast transmissions to more remote client nodes. In an embodiment, coordination of a simultaneous transmission from a plurality of nodes within an LCN is implemented by a client node acting as a master controller by sending a specific transmission time to a plurality of client nodes via a multicast transmission.

In an embodiment, transmission timing instructions comprise instructions for actuating a timer within a modem, such as a countdown timer or a count up timer.

In an aspect, a method of enabling a first client node (CN) within a plurality of client nodes to self-direct simultaneous transmission of a common data packet comprises: a first CN activating a first timer and transmitting the common data packet and transmission timing instructions to a second CN; the second CN receiving the common data packet and transmission timing instructions, activating a second timer, and forwarding the common data packet and the transmission timing instructions to an $n^{th}$ CN; the $n^{th}$ CN receiving the common data packet and the transmission timing instructions and starting an $n^{th}$ timer, where n is an integer greater than or equal to 3; and the first CN, the second CN, and the $n^{th}$ CN simultaneously transmitting the common data packet when the first, second, and $n^{th}$ timers expire. As used herein, a timer expires when it reaches its end value, which may be zero in the case of a countdown timer or a predetermined number in the case of a count up timer.

In an aspect, a method of enabling a first client node (CN) within a plurality of client nodes to self-direct simultaneous transmission of a common data packet comprises: a first CN activating a first timer and transmitting the common data packet and transmission timing instructions to a second CN; the second CN receiving the common data packet and transmission timing instructions, activating a second timer, updating the transmission timing instructions to account for transmission time between the first CN and the second CN, and forwarding the common data packet and the updated transmission timing instructions to an $n^{th}$ CN; the $n^{th}$ CN receiving the common data packet and the updated transmission timing instructions and starting an $n^{th}$ timer, where n is an integer greater than or equal to 3; and the first CN, the second CN, and the $n^{th}$ CN simultaneously transmitting the common data packet when the first, second, and $n^{th}$ timers expire.

In an embodiment, the common data packet is transmitted to the first CN from a first user equipment (UE). In an embodiment, the common data packet is simultaneously transmitted to a second UE in the LCN from the first CN, the second CN and the $n^{th}$ CN.

In an embodiment, the plurality of CNs forms a local communication network.

In an embodiment, the common data packet comprises a destination address within the local communication network. In an embodiment, the common data packet comprises local data.

In an embodiment, the CNs are modems, evolved NodeBs (eNBs), base stations, small cells, microcells, optical network terminals (ONTs), or premises gateways.

In an embodiment, transmission timing instructions designate an amount of time required (i) to recruit a minimum number of CNs, such as a minimum number of CNs required to achieve a particular signal strength or SINR, (ii) to recruit all CNs in the LCN, or (iii) for the data packet to travel a selected geographic distance. In order to determine the number of CNs in the LCN, a first CN may query a base station (e.g., eNB). In an embodiment, a minimum number of CNs is as many CNs as possible within a predetermined amount of time, where the amount of time may be selected, for example, based on the amount of traffic and/or likelihood of collisions on the LCN.

In an embodiment, at least two of the CNs transmit at radio frequencies that are distinct from one another. For example, transmission timing instructions may include instructions to transmit at a specified frequency, if the CN receiving the transmission timing instructions is capable of doing so.

In an embodiment, communication between at least two of the CNs in a LCN occurs through an intermediary CN. For example, when a spatial distance between a first CN and an $n^{th}$ CN is greater than a transmission range of the first CN, the first CN may relay information to the $n^{th}$ CN through an intermediary CN, such as a second CN. In an embodiment, a CN that relays information between other CNs in a LCN may or may not participate in the simultaneous transmission. In an embodiment, not all CNs receiving transmission timing instructions participate in the simultaneous transmission of the common data packet. For example, if the UE associated with the destination address of the common data packet is outside a specified area of the LCN, simultaneous transmission of the common data packet by CNs within the specified area is not necessary.

In an embodiment, the first CN, the second CN, and/or the $n^{th}$ CN is a set of multiple CNs.

In an aspect, a method of enabling inter-node communication between a plurality of modems within a local communication network comprises: receiving, at a first modem of a plurality of modems within a local communication network (LCN), a data packet from a first UE of the LCN for transmission to a second UE of the LCN; identifying the data packet as local data; transmitting the data packet from the first modem directly to a second modem of the plurality of modems using a bandwidth allocated for local data transmissions; and transmitting the data packet from the second CM to the second UE.

BRIEF DESCRIPTION OF THE DRAWINGS

Illustrative embodiments of the present invention are described in detail below with reference to the attached drawings, wherein.

DETAILED DESCRIPTION

In general, the terms and phrases used herein have their art-recognized meaning, which can be found by reference to standard texts, journal references and contexts known to those skilled in the art. The following definitions are provided to clarify their specific use in the context of this description.

As used herein, the term "network" refers generally to any type of telecommunications or data network including, without limitation, hybrid fiber coaxial (HFC) networks, satellite networks, telco networks, and data networks (including MANs, WANS, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, 4G, 5G, LTE/LTE-A, WAP, SIP, UDP, FTP, RTP/RTCP, H.323, etc.).

As used herein, a "node" refers to a physical device within a communication network that is capable of creating, receiving, or transmitting information over a communication channel. Examples of nodes suitable for inter-node communication include but are not limited to modems, cable modems, satellite modems, small cells, base stations, evolved NodeBs, gateways, and optical network terminals (ONTs). Cable television fiber- or HFC-nodes are specifically excluded from the definition of node as the term applies to inter-node communication.

As used herein, "an inter-node interface" refers to a logical communication pathway for node-to-node transmissions that do not pass through the network hub or headend.

As used herein, a "modem" is a device configured to modulate and/or demodulate electromagnetic signals, which may be sent/received by a router, which is included within the term "modem" for purposes of this disclosure.

"Local data" is data that is transmitted between two client nodes without being transmitted through the network hub, and "remote data" is data transmitted between a client node and the network hub. When the client node is a modem, local data is data that is transmitted between two modems without being transmitted through an eNB or base station, and remote data is data transmitted between the modem and the network hub.

"Simultaneous" events occur substantially at the same time, or as close to at the same time as device capabilities and physics allow.

The term "transmitter" is used throughout this document to refer to a device that is capable of transmitting an electromagnetic signal, such as a radio frequency (RF) signal. However, this terminology is not meant to limit the functionality of the devices disclosed herein, which may also be capable of receiving electromagnetic signals and performing other functions.

The terms "direct and indirect" describe the actions or physical positions of one object relative to another object. For example, an object that "directly" acts upon or touches another object does so without intervention from an intermediary. Contrarily, an object that "indirectly" acts upon or touches another object does so through an intermediary (e.g., a third component).

Figure 1:
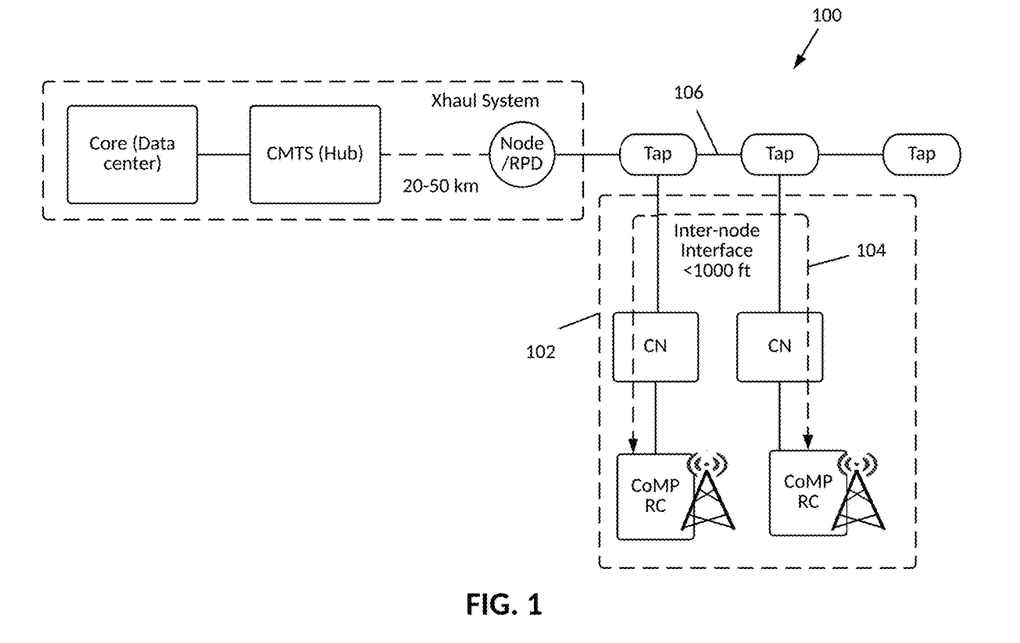
FIG. 1 is a schematic diagram of exemplary network components including a local communication network (LCN) inter-node interface, according to an embodiment.

FIG. 1 is a schematic diagram of an exemplary communication network 100 including a local communication network (LCN) 102 comprising an inter-node interface pathway 104. Communication network 100 includes an Xhaul system comprising a fiber node or remote PHY device in operable communication with a network hub, such as a CMTS, through a mid-haul portion of the Xhaul system. The hub is also connected to a core, such as a data center, via a backhaul portion of the Xhaul system. A typical distance between a fiber node and the network hub is 20-50 km, which contributes significant latency to transmissions passing through the network hub. The communication infrastructure shown in FIG. 1 extends from the node toward an edge (outer periphery) of communication network 100 and includes a plurality of network taps, leading to individual client nodes (CN), such as modems. Each client node and the network hub are communicatively coupled to at least one shared communication medium 106, but client nodes within LCN 102 are also communicatively coupled to one another via inter-node interface pathway 104 (e.g., having a coverage distance of about 1000 feet between client nodes). LCN signals may be transmitted and/or received by a plurality of radio controllers, such as wireless routers/small cells, associated with each of the client nodes. In an embodiment, the radio controllers are configured for coordinated multipoint (COMP) transmission.

Shared communication medium 106 is used by each client node, as well as by the network hub, to transmit information. Communication network 100 is configured to use shared communication medium 106 for at least two purposes. First, communication network 100 uses shared communication medium 106 to transmit local data between at least two client nodes, e.g., from tap to tap or over a wireless inter-node interface. Second, communication network 100 uses shared communication medium 106 to transmit remote data between client nodes and the network hub. In some embodiments, shared communication medium 106 is a coaxial electrical cable and an optical cable. One or more client nodes are, for example, customer premises equipment (CPE), such as equipment located at a residence or a business. Examples of a customer premises equipment include, but are not limited to, a modem, an ONT, and/or a premises gateway. A premises gateway includes, for example, a communication device, such as a cable modem or an ONT, along with additional equipment, such as equipment providing networking functionality, data storage, and/or wireless communication (e.g. Wi-Fi or other unlicensed or licensed wireless communication). However, client nodes are not limited to customer premises equipment. For example, in some embodiments, one or more client nodes is a wireless base station, such as a LTE wireless base station (eNB), 5G NR wireless base station, a 6G wireless base station, an unlicensed radio spectrum wireless base station (e.g., a Wi-Fi or unlicensed NR), or extensions and/or variations thereof.

As discussed above, conventional communication networks use a shared communication medium for one purpose, i.e. to transmit data between client nodes and a network hub. Communication network 100, in contrast, uses shared communication medium 106 for at least two purposes, e.g. for transmission of both local and remote data. Therefore, communication network 100 can potentially achieve higher capacity than conventional communication networks with similar shared communication media. Additionally, the relatively short path between client nodes via shared communication medium 106 helps minimize latency of local data transmission. In contrast, distance between client nodes and the network hub may be relatively long, potentially causing significant latency of remote data between client nodes and the network hub.

Figure 2:
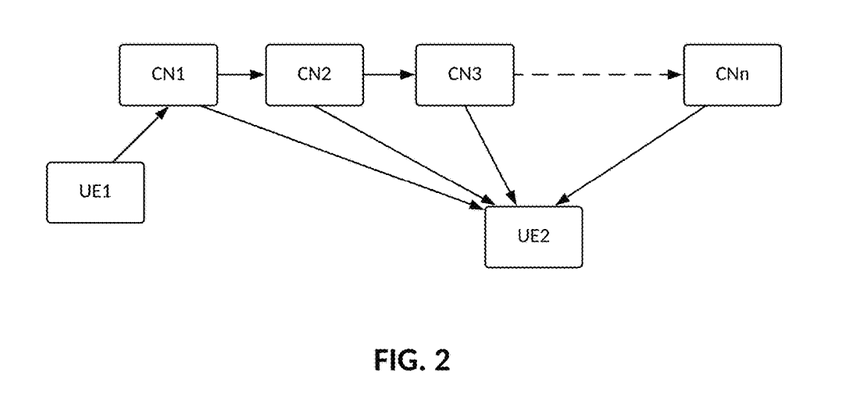
FIG. 2 is a schematic diagram of simultaneous transmission of a data packet from UE1 to UE2 via an inter-node interface established through a plurality of client nodes, according to an embodiment.

FIG. 2 is a schematic diagram of simultaneous transmission of a data packet to UE2 via inter-node interface pathway 104. As shown, UE1 transmits a data packet to a first client node (CN1), which identifies the data as local data having a destination address within LCN 102. For example, a processor within CN1 compares the destination address of the data packet with data stored in a memory of CN1 to determine that the data packet comprises local data. CN1 then activates a first communication module within CN1 to route the data packet via the inter-node interface 104 to CN2. The first communication module may, for example, modulate a signal within a bandwidth allocated for local transmissions to transmit the data packet to a second client node (CN2). At the same time, CN1 may send transmission timing instructions to CN2 as part of a self-directed transmission sequence for achieving simultaneous transmission from a plurality of client nodes within LCN 102 without utilizing resources from the Xhaul system. Additional details for forwarding the data packet from CN2 to CN3 to . . . CNn and achieving simultaneous transmission of the data packet from two or more of the client nodes to UE2 are disclosed below.

Figure 3:
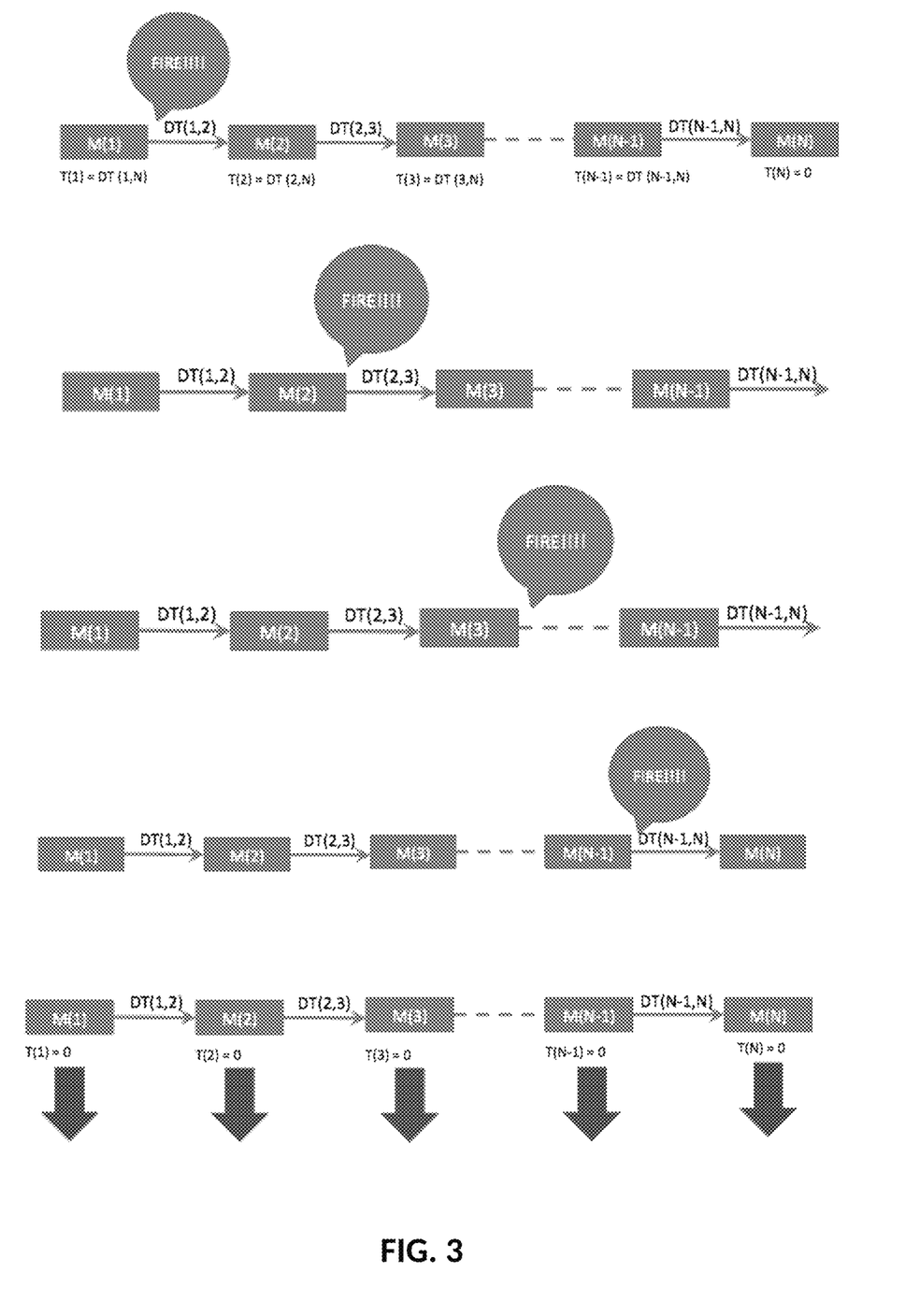
FIG. 3 provides an illustration of an exemplary firing squad algorithm, according to an embodiment.

In an embodiment, transmission timing instructions for achieving self-directed simultaneous transmission from a plurality of client nodes within an LCN, without input from a scheduling device that is synchronized with the timestamp of communication network 100 (i.e., without the benefit of time convergence), may be based on a firing squad algorithm. An exemplary firing squad algorithm is illustrated in FIG. 3, which shows sequential "FIRE!!!" commands, which represent transmission timing instructions.

Firing Squad Algorithm

Problem Statement: N Stations Need to be Synchronized in Order to Transmit/Receive at the Same Time The time for information to travel between stations—DT (1,2), DT(2,3), etc.—is known.

$$DT1, N = DT(1, 2) + DT(2, 3) + \ldots + DT(N-1, N) \rightarrow DT1,$$

$$n = \sum_{n=1}^{N-1} DT(n, n+1)$$

In general, every station/client node/modem M(j) is able to calculate DTj,N:

$$DTj, N = DT(j, j+1) + DT(j+1, j+2) + \ldots + DT(N-1, N) \rightarrow DTj,$$

$$n = \sum_{n=j}^{N-1} DT(n, n+1)$$

Every M(j) also keeps a time counter T(j) that gets initialized to DT(j,N).

An exemplary process, which for simplicity is hosted in M(1), gives a FIRE signal (i.e., sends transmission timing instructions). M(1) forwards the FIRE message to M(2) and activates its timer to start the countdown. M(2) after DT(1,2) receives and forward the FIRE message to M(3) and activates its timer to start the countdown. This is the status of the timers:

$$T(1) = DT(1, N) - DT(1, 2)$$
$$T(2) = DT(2, N)$$
$$T(N-1) = DT(N-1, N)$$
$$T(N) = 0$$

M(3), after DT(1,2)+DT(2,3), receives and forwards the FIRE message to M(3) and activates its timer to start the countdown. This is the status of the timers:

$$T(1) = DT(1, N) - DT(1, 2) - DT(2, 3)$$
$$T(2) = DT(2, N) - DT(2, 3)$$
$$T(N-1) = DT(N-1, N)$$
$$T(N) = 0$$

M(N−1), after DT(1,2)+ . . . +DT(N−2,N−1), receives and forwards the FIRE message to M(N) and activates its timer to start the countdown. This is the status of the timers:

$$T(1) = DT(1, N) - DT(1, 2) - DT(2, 3) - \ldots - DT(N-2, N-1)$$
$$T(2) = DT(2, N) - DT(2, 3) - \ldots - DT(N-2, N-1)$$
$$T(N-1) = DT(N-1, N)$$
$$T(N) = 0$$

M(N) receives the FIRE signal and because its timer is set to 0 it fires immediately, and does not forward the FIRE message to any further stations. Also, all the other stations fire (i.e., transmit the data packet to the destination address) at the same time. This is the status of the timers:

$$T(1) = DT(1, N) - DT(1, 2) -$$
$$DT(2, 3) - \ldots - DT(N-2, N-1) - DT(N-1, N) = 0$$
$$T(2) = DT(2, N) - DT(2, 3) - \ldots - DT(N-2, N-1) - DT(N-1, N) = 0$$
$$T(N-1) = DT(N-1, N) - (DT(N-1, N) = 0$$
$$T(N) = 0$$

For simultaneous reception of a signal by a plurality of stations/client nodes/modems, the initiating station would use a future target timestamp for receiving the same way it uses the firing squad algorithm for transmitting, except that when the timer expires all the routers/modems/antennas and small cells receive at the same time.

Alternative Firing Squad Algorithm

The firing squad synchronization problem can also be solved by successively subdividing the line of cells into halves, quarters, eighths, etc. until all cells of the line are division points. At this time they all can fire simultaneously. By always dividing the line into two equal parts, and then subdividing each of those parts into two equal parts, and so on, the synchronization of the firing can be assured.

To divide the line into two equal parts, the initiating CN simultaneously sends out two signals, S1 and $2. Then, both signals travel to the left, $1 at a speed of one machine per time unit, and $2 at a speed of one machine every three time units. When $1 reaches the far end of the line, the end machine sends back a signal, $3, which travels at a speed of one machine per time unit to the right. Signals $2 and $3 will meet at the center of the line, for, if P is the length of the line, then $1 and $3 combined have traveled a distance of 3P/2 while $2 has traveled a distance of P/2, a ratio of three to one, which is the same as the ratio of their respective speeds. Since $2 moves to the left only once every three units, the machine containing this signal must count to three (i.e., $2-1, $2-2, $2-3). By the state of the machine when $2 and $3 are encountered, it can be determined whether the line is of even or odd length, and hence, whether both machines should become "middle men" or just the one containing $2. These middle men (or man) then act like the original CN, sending out both $1 and $2 signals to the left and also to the right. This process is repeated over and over until all the men (machines/client nodes) in the line are middle men, at which time firing occurs.

Figure 4:
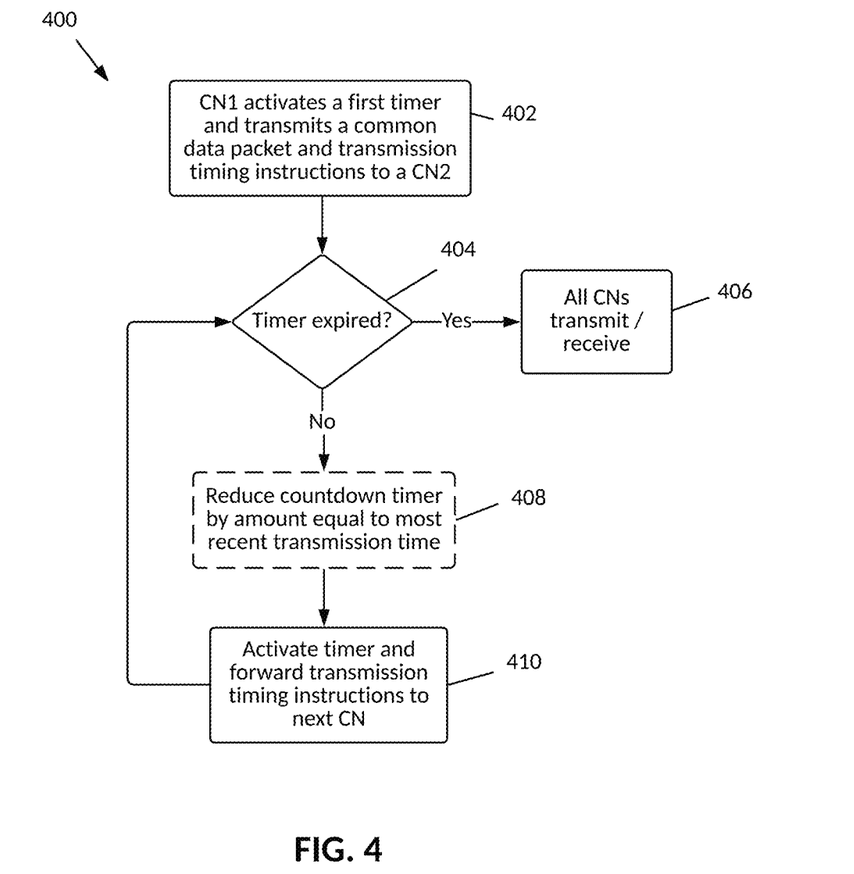
FIG. 4 is a flowchart illustrating steps in a method of enabling a client node within a plurality of client nodes to self-direct simultaneous transmission of a common data packet, according to an embodiment.

FIG. 4 is a flowchart 400 illustrating steps in a method of enabling a plurality of client nodes to self-direct simultaneous transmission of a common data packet. In step 402, a first CN (CN1) initiates the method by activating a first timer and transmitting a common data packet, such as a data packet received from a first UE, and transmission timing instructions to a second CN (CN2). CN2 queries whether the timer has expired, in step 404. If the answer is "yes", all CNs that have received the transmission timing instructions simultaneously transmit the common data packet (step 406). If the answer to query 404 is "no", CN2 may perform optional step 408 to adjust the transmission timing instructions by an amount equal to the most recent transmission time (in this case, the transmission time from CN1 to CN2). In step 410, CN2 activates its timer and forwards the transmission timing instructions to the next CN, which then returns to query 404, and repeats the steps, including step 408 if it was previously performed. If optional step 408 was initially omitted, it is omitted in each repetition of steps 404 and 410, and each CN that receives the transmission timing instructions calculates overall transmission time from CN1 to itself.

Embodiments disclosed herein may be implemented in a variety of ways as a matter of design choice. In this regard, the invention can take the form of an entirely software embodiment or an embodiment containing both hardware and software elements. In an embodiment, the invention is implemented in software, which includes but is not limited to firmware, resident software, microcode, etc. Furthermore, the invention can take the form of a computer program product accessible from the computer readable medium providing program code for use by or in connection with a computer or any instruction execution system. For the purposes of this description, the computer readable medium can be any apparatus that can tangibly store the program for use by or in connection with the instruction execution system, apparatus, or device, including the computer system.

The medium can be any tangible electronic, magnetic, optical, electromagnetic, infrared, or semiconductor system (or apparatus or device). Examples of a computer readable medium include a semiconductor or solid state memory, magnetic tape, a removable computer diskette, a random access memory (RAM), a read-only memory (ROM), a rigid magnetic disk and an optical disk. Some examples of optical disks include compact disk-read only memory (CD-ROM), compact disk-read/write (CD-R/W) and DVD.

The computing system, suitable for storing and/or executing program code, can include one or more processors coupled directly or indirectly to memory through a system bus. The memory can include local memory employed during actual execution of the program code, bulk storage, and cache memories which provide temporary storage of at least some program code in order to reduce the number of times code is retrieved from bulk storage during execution. Input/output (I/O) devices (including but not limited to keyboards, displays, pointing devices, etc.) can be coupled to the system either directly or through intervening I/O controllers. Network adapters may also be coupled to the system to enable the computing system to become coupled to other data processing systems, such as through host systems interfaces, or remote printers or storage devices through intervening private or public networks. Modems, cable modem and Ethernet cards are just a few of the currently available types of network adapters.

STATEMENTS REGARDING INCORPORATION BY REFERENCE AND VARIATIONS

All references cited throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments, exemplary embodiments and optional features, modification and variation of the concepts herein disclosed can be resorted to by those skilled in the art, and that such modifications and variations are considered to be within the scope of this invention as defined by the appended claims. The specific embodiments provided herein are examples of useful embodiments of the invention and it will be apparent to one skilled in the art that the invention can be carried out using a large number of variations of the devices, device components, and method steps set forth in the present description. As will be apparent to one of skill in the art, methods, software and apparatus/devices can include a large number of optional elements and steps. All art-known functional equivalents of materials and methods are intended to be included in this disclosure. Nothing herein is to be construed as an admission that the invention is not entitled to antedate such disclosure by virtue of prior invention.

When a group of substituents is disclosed herein, it is understood that all individual members of that group and all subgroups are disclosed separately. When a Markush group or other grouping is used herein, all individual members of the group and all combinations and subcombinations possible of the group are intended to be individually included in the disclosure.

It must be noted that as used herein and in the appended claims, the singular forms "a", "an", and "the" include plural reference unless the context clearly dictates otherwise. Thus, for example, reference to "a processor" includes a plurality of such processors and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are described.

Whenever a range is given in the specification, for example, a range of integers, a temperature range, a time range, a composition range, or concentration range, all intermediate ranges and subranges, as well as all individual values included in the ranges given are intended to be included in the disclosure. As used herein, ranges specifically include the values provided as endpoint values of the range. As used herein, ranges specifically include all the integer values of the range. For example, a range of 1 to 100 specifically includes the end point values of 1 and 100. It will be understood that any subranges or individual values in a range or subrange that are included in the description herein can be excluded from the claims herein.

As used herein, "comprising" is synonymous and can be used interchangeably with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" can be replaced with either of the other two terms. The invention illustratively described herein suitably can be practiced in the absence of any element or elements, limitation or limitations which is/are not specifically disclosed herein.

What is claimed is:

1. A method of enabling inter-node communication between a plurality of modems within a local communication network (LCN) including a shared communication medium in operable communication with (a) a modem termination system (MTS) remote from the LCN, and (b) each modem of the plurality of modems, the method comprising the steps of:
    receiving, at a first modem of a plurality of modems within the LCN, a first data packet from a first UE within the LCN for transmission to a second UE within the LCN;
    identifying the first data packet as including local data to the LCN;
    transmitting the first data packet and transmission timing instructions from the first modem directly over an inter-modem interface separate from the shared communication medium, without first passing through the MTS, to a second modem of the plurality of modems over an inter-modem interface separate from the shared communication medium that does not pass through the MTS, using a bandwidth allocated for local data transmissions; and
    simultaneously transmitting the first data packet to the second UE directly from the first modem and directly from the second modem over the segment of the shared communication medium without first passing through the MTS,
    wherein the first data packet is transmitted according to a Data Over Cable Service Interface Specification (DOCSIS) protocol.

2. The method of claim 1, wherein the first modem and the second modem are connected to a shared transmission medium.

3. The method of claim 2, wherein the shared transmission medium is selected from the group consisting of a coaxial electrical cable, a hybrid fiber coaxial cable, an optical cable, a wireless transmission medium and combinations thereof.

4. A method of enabling inter-node communication between a plurality of modems within a local communication network (LCN) including a shared communication medium in operable communication with (a) a modem termination system (MTS) remote from the LCN, and (b) each modem of the plurality of modems, the method comprising the steps of:
    receiving, at a first modem of the plurality of modems within the LCN, a first data packet from a first UE within the LCN for transmission to a second UE within the LCN;
    identifying the first data packet as including local data to the LCN;
    transmitting the first data packet and transmission timing instructions (a) directly, without first passing through the MTS, from the first modem to an intermediary modem of the plurality of modems in communication with the shared communication medium, and (b) directly, from the intermediary modem to a second modem of the plurality of modems over an inter-modem interface separate from the shared communication medium that does not pass through the MTS, using a bandwidth allocated for local data transmissions; and
    simultaneously transmitting the first data packet to the second UE directly from (a) the first modem, and (b) the second modem, over a segment of the shared communication medium without first passing through the MTS,
    wherein the substeps of transmitting directly from the first modem to the intermediary modem and directly from the intermediary modem to the second modem occur prior to the first, intermediary, and secondary modems communicating with the MTS, and
    wherein the first data packet is transmitted according to a Data Over Cable Service Interface Specification (DOCSIS) protocol.

5. The method of claim 4, wherein the transmission timing instructions comprise instructions for the intermediary modem to relay to the second modem updated transmission timing instructions adjusted by an amount of time the first data packet travels between the first modem and the intermediary modem.

6. The method of claim 1, wherein the transmission timing instructions comprise a firing squad algorithm.

7. The method of claim 1, wherein the first modem and/or the second modem is a set of multiple modems.

8. The method of claim 1, wherein the step of simultaneously transmitting is self-directed by the first modem.

9. The method of claim 1, further comprising the steps of:
    receiving a second data packet at the first modem within the LCN for transmission to a third UE outside of the LCN;
    identifying the second data packet as including data that is not local to the LCN; and
    transmitting the second data packet, over the shared communication medium, to the MTS for the MTS to deliver the second data packet to the third UE.

10. The method of claim 1, wherein the MTS is contained within an Xhaul communication system.

11. The method of claim 10, wherein segment of the shared communication medium is disposed remotely from the Xhaul communication system.

12. A communication network, comprising:
an Xhaul transport subsystem connected to a shared communication medium and configured to send data traffic over the shared communication medium according to a Data Over Cable Service Interface Specification (DOCSIS) protocol; and
a local communication network (LCN) disposed remotely from the Xhaul transport subsystem, and including first and second nodes in communication with the MTS over the shared communication medium,
wherein the first modem is configured to:
receive a first DOCSIS protocol data packet from a first UE within the LCN;
identify the first DOCSIS protocol data packet as including data local to the LCN;
transmit the first DOCSIS protocol data packet with transmission timing instructions directly to the second node over an internode interface separate from the shared communication medium;
self-direct the second node to transmit the first DOCSIS protocol data packet to a second UE within the LCN simultaneously with a transmission of the first DOCSIS protocol data packet from the first node to the second UE;
receive a second DOCSIS protocol data packet from the first UE;
identify the second data packet as including data that is not local to the LCN; and
transmitting the second data packet over the shared communication medium to the Xhaul transport subsystem.

13. The communication network of claim 12, wherein the Xhaul transport subsystem includes a modem termination system (MTS).

14. The communication network of claim 13, wherein the Xhaul transport subsystem further includes (a) a remote physical layer device in operable communication with the MTS over a mid-haul portion of the Xhaul transport subsystem, and (b) a hub core in operable operable communication with the MTS over a backhaul portion of the Xhaul transport subsystem.

* * * * *